Jan. 22, 1963   W. HENNY   3,074,690
FIXED NOZZLE SUPPORT FOR GAS TURBINE ENGINE
Filed Sept. 15, 1960
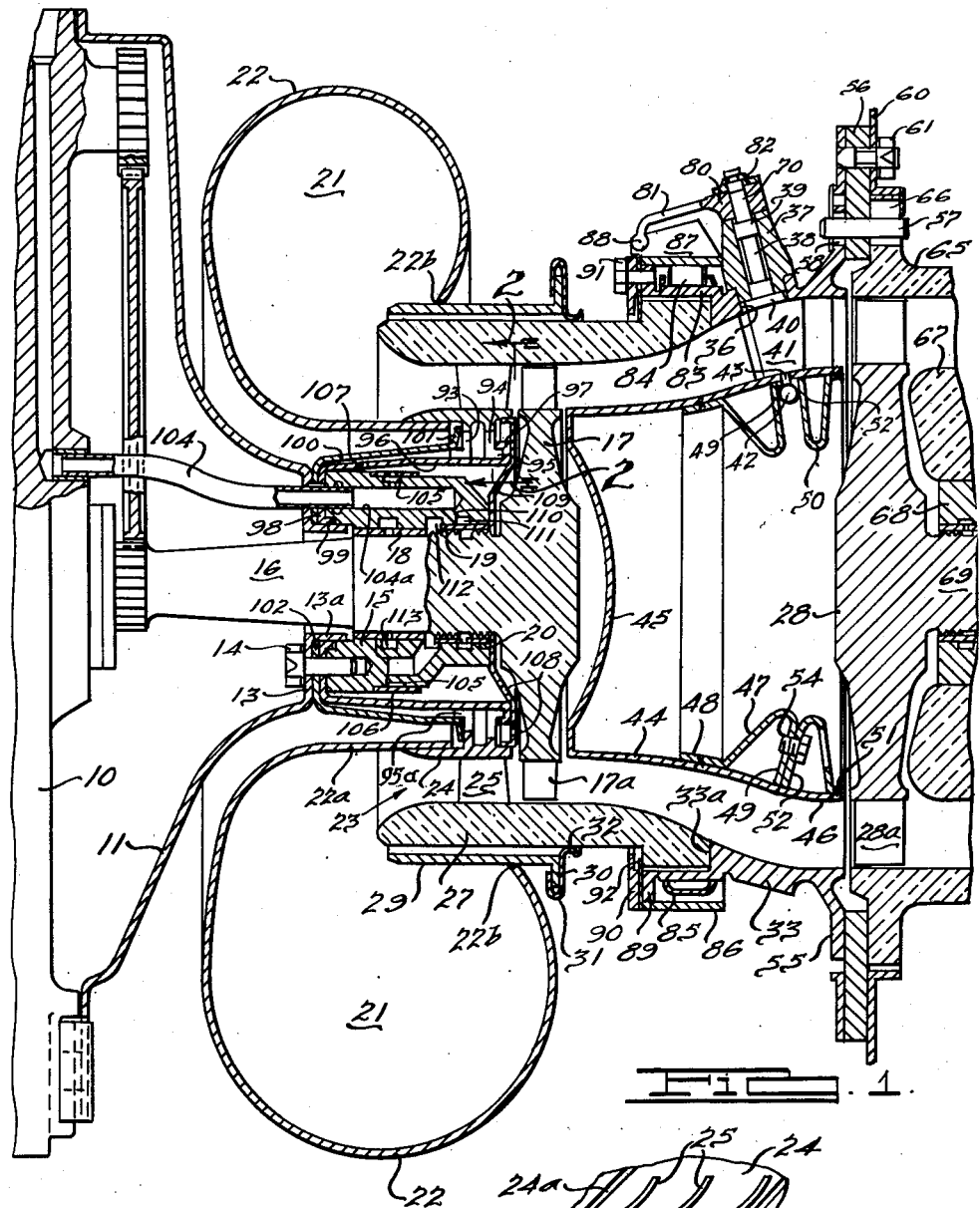
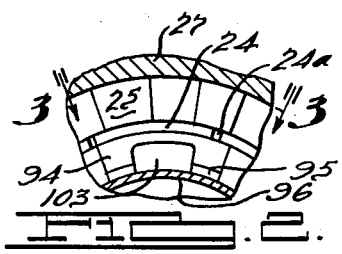
INVENTOR.
Willi Henny
BY Harness & Harris
ATTORNEYS

United States Patent Office 3,074,690
Patented Jan. 22, 1963

3,074,690
FIXED NOZZLE SUPPORT FOR GAS TURBINE ENGINE
Willi Henny, Southfield, Mich., assignor to Chrysler Corporation, Highland Park, Mich., a corporation of Delaware
Filed Sept. 15, 1960, Ser. No. 56,283
7 Claims. (Cl. 253—78)

This invention relates to gas turbine engines and in particular to improved means for supporting the fixed first stage nozzle blades which direct the hot motive gases against the first stage rotor of an automotive gas turbine engine.

Although application of the present invention is not limited to use with first stage nozzle blades and may be used to support the nozzle blades of any turbine stage where the thermal and structural environment give rise to similar problems, supporting the first stage nozzle blades of an automotive gas turbine engine encounters particular problems because of the great operational temperature extremes to which the nozzle blades and their associated structures are subjected.

In a conventional automotive gas turbine engine, hot motive driving gases are conducted to the peripheral blades of the first stage rotor by an annular gas passage containing a plurality of fixed nozzles or blades immediately upstream of the rotor blades. An annular outer shroud section around the rotor blades is preferably supported at least in part by the radially outer edges of the fixed nozzles. An inner annular nozzle support is suitably connected at its outer periphery to the fixed nozzles, as for example by means of an annular inner shroud section, and is secured at its inner periphery to a fixed portion of the engine, as for example the bearing housing for the first stage rotor. In such a construction, the inner and outer shroud sections comprise parts of the inner and outer walls of said gas passage.

In order to minimize bypassing of the rotor by the motive gases, it is important to maintain the inner periphery of the annular outer shroud section as close as possible to the outer periphery scribed by the rotor blades, while maintaining operating clearance therewith as the rotor and juxtaposed shroud portions expand or contract with changing temperature conditions. In consequence of the extreme temperature range of the motive gases between idling and maximum power output conditions of the engine, difficulty has been experienced in matching the expansion of the fixed nozzle support and of the rotor so as to maintain a uniform radial spacing between the rotor and outer shroud section and between the inner and outer shroud sections at the region of the nozzles. If the nozzles and their supporting structure are caused to expand at a greater rate or to contract at a lesser rate than the corresponding expansion or contraction of the outer shroud section, the nozzles will be severely compressed against the outer shroud section resulting in damage to the nozzles or outer shroud section either by buckling of the nozzles or by embedding the latter into the material of the outer shroud section. When the operating temperature conditions change to relieve the compression force on the nozzles, a loose support for the outer shroud section will result and the latter will rub against or bind the peripheral blades of the rotor.

Also during operation of structures known heretofore under optimum load, the outer periphery of the annular nozzle support proximate the hot motive gases tends to expand thermally to a greater extent than its inner periphery proximate the much cooler rotor bearing support. In consequence, circumferential expansion and radial enlargement of the hot outer periphery that would otherwise occur is restrained by the comparatively cool central portion of the support, with the result that the periphery of the support is subjected to a compressional force that deforms and shrinks the support when its outer periphery is eventually cooled. If the initial clearance between the outer shroud and the rotor periphery is at the desired minimum for optimum efficiency after a number of such heating and cooling cycles the outer radius of the nozzle support will shrink sufficiently in some cases to cause the outer shroud supported thereby to bind the rotor. In any event with conventional structures, the extent of shrinking cannot be predetermined accurately, so that optimum operational clearance cannot be maintained for most efficient operation.

An object of the present invention is to provide an improved supporting structure for the fixed nozzles of a gas turbine engine which avoids the foregoing problems and enables control over the thermal expansion and contraction of the supporting structure so as to minimize its permanent deformation.

Another object is to provide improvements in a gas turbine engine having a bladed rotor and inner and outer annular shroud sections defining an annular passage for conducting hot motive gases to the peripheral blades of the rotor, the outer shroud section being supported by the outer peripheral ends of a plurality of fixed flow directing nozzles arranged annularly within said passage adjacent and in advance of the rotor blades. A support for the fixed nozzles comprises a pair of tubular heat dissipating bodies extending coaxially of the rotor and annularly arranged nozzles, said bodies having portions in resilient clamping engagement with axially opposite sides respectively of radial extensions of said nozzles, the innermost of the coaxial tubular bodies engaging the radial inner ends of said extensions to support the same. From said nozzle extensions, said bodies extend axially and are secured in heat exchange relationship to a comparatively cool fixed portion of the engine shielded from the hot motive gases, thereby to effect an appreciable axial thermal gradient along the heat dissipating bodies and to enable radial expension and contraction of their nozzle engaging portions comparatively freely without permanent deformation.

Such freedom of expansion and contraction of the nozzle supporting portions of the heat dissipating bodies results because a solid core of disk-like mass of material of the nozzle support extending directly radially from a hot periphery to a comparatively cool central region is avoided. Instead of a radial temperature gradient between a hot outer periphery and a cool central core, the temperature gradient extends axially with the result that the tubular bodies expand and contract somewhat conically in accordance with their axial temperature gradients. Within ordinarily encountered operational temperatures, there is no limit to the axial thermal gradient that can be taken by the tubular heat dissipating bodies. By suitably determining their axial length, which can be as long as desired in order to dissipate heat from their hot nozzle engaging and supporting portions, the radial expansion and contraction of the heat dissipating bodies can be determined so as to match the radial expansion and contraction of the rotor and outer shroud section.

Other objects are to provide a nozzle support of the above character which can be readily and economically fabricated and assembled, which comprises a minimum of parts and is readily secured to said fixed nozzle blades with a minimum of screws or other fasteners, and which is readily cooled by a fluid coolant to facilitate control of the axial temperature gradient of the coaxial heat dissipating bodies.

Still another object is to provide such a structure wherein the heat dissipating bodies extend coaxially within the inner wall of the passage for the hot motive gases and is thereby shielded from said gases.

Other objects of this invention will appear in the following description and appended claims, reference being had to the accompanying drawings forming a part of this specification wherein like reference characters designate corresponding parts in the several views.

FIGURE 1 is a longitudinal mid-sectional view through the rotors of an automotive gas turbine engine embodying the present invention.

FIGURE 2 is a fragmentary transverse sectional view taken in the direction of the arrows substantially along the line 2—2 of FIGURE 1.

FIGURE 3 is a fragmentary elevational view taken in the direction of the arrows substantially along the arcuate line 3—3 of FIGURE 2.

It is to be understood that the invention is not limited in its application to the details of construction and arrangement of parts illustrated in the accompanying drawings, since the invention is capable of other embodiments and of being practiced or carried out in various ways. Also it is to be understood that the phraseology or terminology employed herein is for the purpose of description and not of limitation.

An embodiment of the present invention is illustrated by way of example in an automotive gas turbine engine having a fixed frame including a compressor-diffuser wall 10, which may be an aluminum alloy casting, suitably secured to a sheet metal compressor-turbine support 11 so as to accommodate relative thermal expansion and contraction therebetween. The support 11 includes an annular radially directed flange 13 which terminates in an annular axially directed flange 13a, the flange 13 being secured by a plurality of bolts 14 to a fixed annular hub or bearing support 15. A rotor shaft 16 for a first stage turbine rotor 17 is journalled within the support 15 by means of a ported bushing 18. Between the latter and the rotor 17 is a labyrinth seal 19 enclosed within a ported sleeve 20.

The left end of the shaft 16 is suitably connected to an air compressor which supplies combustion supporting air for the engine to a combustion chamber, not shown. The hot motive gases from the combustion chamber are then directed into a spiral collecting chamber 21 defined by a sheet metal wall 22 having an annular inner portion 22a comprising a portion of the inner wall of an annular gas passage 23. The passage 23 conveys the hot motive gases from the collecting chamber 21 axially of the rotor 17 to the latter's peripheral blades 17a and thence to the peripheral blades 28a of a coaxial second stage rotor 28. The latter may be connected by speed reducing gears to the driving wheels of the vehicle.

The annular gas passage 23 is defined by a number of inner and outer annular shroud sections including a segmented inner shroud section formed from a plurality of circumferentially extending shroud segments 24. Each of the segments 24 includes a leftward axial extension closely overlying the adjacent edge of the wall 22a in sliding relation and terminates at its rightward axial edge adjacent the rotor 17 at the base of the blades 17a. Each segment 24 also carries a plurality of integral radially extending fixed nozzles or blades 25. The nozzles 25 are uniformly spaced circumferentially within the passage 23 immediately in advance of the rotor blades 17a to direct the motive gases thereto and support on their radially outer ends an annular outer shroud section 27, as for example of ceramic or metallic alloy having a comparatively low coefficient of thermal expansion. Extending coaxially around the shroud 27 and spaced radially therefrom is an annular sleeve 29 having an annular flange 30 at its right end. A resilient sealing channel 31 engages the flange 30 in fluid sealing relation and is provided with a resilient annular base 32 yieldingly engaging the outer surface of the shroud 27 in fluid sealing relation. The wall 22 of spiral chamber 21 extends from the portion 22a to the sleeve 29 and is welded thereto at an annular seam 22b.

To the right of the shroud section 27, a portion of the outer wall of passage 23 is formed by an annular nozzle block 33 which cooperates with the shroud section 27 to provide an unbroken outer wall terminating at its right edge adjacent the outer ends of the second stage rotor blades 28a. The nozzle block 33 is provided with a plurality of generally radially extending circumferentially spaced bores 36 arranged in the plane of a conical envelope around the axis of the rotors 17 and 28 perpendicular to the conically enlarging wall portion of the gas passage 23 provided by nozzle block 33. A tubular bushing 37 snugly pressed within each bore 36 provides a journal mounting for a spindle 38 having enlarged bearing portions 39 rotatably engaging the cylindrical inner surface of bore 38 and also having an enlarged annular sealing flange 40 at its radially inner end abutting the inner end of the bushing 37 around the bore 36. Secured to the inner end of each spindle 38 within the passage 23 immediately in advance of the rotor blades 28a is an adjustable nozzle blade 41 which is pivotally adjustable about the axis of its associated spindle 38 to adjust the angle of attack of the motive gases against the blades 28a. Also extending coaxially with each spindle 38 is a ball element 42 spaced from and integrally connected with the radially inner end of the associated blade 41 by a reduced neck portion 43.

Between the rotors 17 and 28, the inner wall of the passage 23 comprises a two-part intermediate inner shroud including a cup-shaped portion having an annular shroud section 44 and an integral dished base or baffle 45 which prevents axial flow of the motive gases interiorly of the shroud section 44. The inner intermediate shroud is completed by an annular shroud section 46 contiguous to the shroud section 44 and terminating axially adjacent the base of the rotor blades 28a. A resilient bracket 47 having an annular flange 48 welded to the interior shroud section 44 is provided with a plurality of circumferentially spaced resilient flanges 49 extending substantially parallel to the plane of the conical envelope containing the axes of the spindles 38. A second bracket 50 having an annular flange 51 welded to the interior of shroud section 46 provides a plurality of circumferentially spaced flanges 52 mating with and extending in parallelism with the flanges 49. Each ball element 42 is resiliently clamped between the radially outer ends of a mating pair of flanges 49 and 52. Between each pair of adjacent balls 42, a pair of mating flanges 49 and 52 are secured together by a bolt 54, thereby to secure the shroud sections 44 and 46 together.

Extending radially outward from the right edge of nozzle block 33 is an annular flange 55 adjustably secured to a ring 56 by means of three dowels 57 uniformly spaced circumferentially around the axis of the rotors 17 and 28. The dowels 57 are firmly secured within ring 56 and extend axially in opposite directions therefrom. The left end of each dowel 57 is closely confined within a radial slot 58 in flange 55. The ring 56 is suitably secured to other fixed parts of the engine as for example by means of a sheet metal bulkhead 60 secured to the ring 56 by bolts 61. An outer shroud section 65, which may be of ceramic or other material having a comparatively low coefficient of thermal expansion, extends closely around the outer edges of the blades 28a to complete the outer wall of passage 23. Shroud 65 is provided with three radial slots 66 closely confining the right ends of the dowels 57 respectively, the slots 58 and 66 accommodating relative radial expansion and contraction between the block 33, shroud 65, and ring support 56. An annular inner shroud 67 extends from adjacent the rotor 28 at the base of the blades 28a to complete the inner wall of the passage 23 and is suitably supported on a bearing support 68 for the shaft 69 of rotor 28.

A radially outer portion of each spindle 38 is splined at 70 to the hub 80 of one of each of a corresponding plurality of swinging arms 81. A C-shaped Belleville type washer is suitably secured to an extension of spindle 38 above the hub 80 and is under resilient tension urging the latter radially inward and spindle 38 radially outward, thereby to maintain the annular seal 40 in sealing engagement with the inner end of the corresponding bushing 37.

The nozzle block 33 is also provided with a cylindrical roller supporting platform 83 coaxial with the rotors 17 and 28 and supporting several uniformly and circumferentially spaced cylindrical rollers 84 maintained in spaced relationship by means of an annular bearing race 85. Rotatable on the rollers 84 is an annular ring 86 supporting pairs of parallel circumferentially spaced plates 87. Each pair of plates 87 defines an axially extending channel slidably confining therein the ball end 88 of one of each of the swinging arms 81, so that upon rotation of ring 86, the swinging arms 81 and associated spindles 38 and blades 41 are adjustably pivoted in unison about the axes of the spindles 38.

A clamping ring 90 is secured by a plurality of bolts 91 to a radial flange 89 at the left edge of platform 83, an annular spring retainer 92 being secured between the ring 90 and flange 89 and extending radially inwardly to overlap a radial enlargement of shroud 27, thereby to urge the latter yieldingly to the right against an annular abutment wall 33a of nozzle block 33.

Details of the support for the fixed nozzles 25 are illustrated in FIGURES 2 and 3. Each shroud segment 24 is provided with a plurality of pairs of axially spaced footings 93 and 94. The radial inner ends of the footings 93 and 94 terminate in annularly arranged segmental flanges 95a and 95 respectively, the latter extends axially toward rotor 17 and the former flange extends away from the rotor 17. In order to direct the motive gases at the desired angle against the rotor blades 17a, the radially extending fixed nozzle blades 25 are biased from front to rear in FIGURE 2 with respect to the axis of rotor 17. Similarly the circumferential ends of the segments 24 are biased from front to rear and are provided with a slight circumferential spacing 24a therebetween to enable thermally induced expansion during operation.

A tubular heat dissipating body 96 extending coaxially with rotor 17 closely engages the radial inner ends of the footings 93 and 94 in supporting relation and terminates in an annular hook portion 97 which closely hooks around the flange 95. The other end of tubular body 96 has an integral annular inturned flange 98 confined between flange 13 and support 15, the flange 98 terminating in an axially directed annular flange 99 fitting within a mating annular recess in support 15 and secured therein by flange 13a.

An outer tubular heat dissipating body 100 coaxial with rotor 17 terminates in an annular resilient flange 101 overlapping flange 95a and abutting the footings 93 in fluid sealing relation adjacent their junctures with the associated shroud segments 24 and yieldingly urging the latter rightward so as to force flange 95 into engagement with the hook portion 97. The end of body 100 overlapping flange 95a prevents radial outward cocking of the left edges of the shroud segments 24. The tubular body 100 extends axially along the length of the body 96 in radially spaced relationship and terminates in an annular flange 102 confined between flanges 98 and 13. Radially inward of the region of contact between the footings 93 and flange 101, these footings as well as the footings 94 are spaced circumferentially as indicated at 103, FIGURE 2, in order to enable air circulation around these footings and to minimize heat transfer therefrom to the body 96.

In order to attain efficient operation of the engine, it is essential to maintain the minimum clearance between the blades 17a and outer shroud 27 required to prevent binding between these parts. The outer shroud 27 is formed of comparatively low expansion metal or ceramic designed to match the radial thermal expansion of rotor 17. The latter on the other hand has a comparatively cool central shaft 16 which restrains radial expansion of its hotter outer periphery exposed to the hot motive gases. The outer periphery thus tends to expand less than similarly heated portions having no appreciable radial thermal gradient, as for example the supporting structure for the nozzles 25. The present construction reduces the thermal expansion of the hot right ends of the tubular bodies 96 and 100 by reason of axial heat conduction along said bodies from the resilient flange 101 and hook portion 97, whereby the temperature of said hot right ends is maintained at a reduced level with respect to the temperature of the shroud segments 24 and outer periphery of the rotor 17. In consquence, the radial thermal expansion and contraction of flange 101, the right end of tubular body 96, and hook portion 97 can be readily matched with the corresponding expansion and contraction of the outer periphery of the rotor 17 by suitably predetermining the length and wall thickness of the tubular bodies 96 and 100.

It is apparent that the axial length of the bodies 96 and 100 can be made as long as required in order to provide adequate area for dissipating heat conducted thereto from the footings 93 and 94 and to establish any desired axial temperature gradient along the length of the bodies 96 and 100. In addition, the integral flanges 98 and 102 of the bodies 96 and 100 are maintained in heat transfer relationship with the comparatively cool hub flange 13 in order to conduct heat thereto. By virtue of the structure described, the hook portion 97 and flange 101 are not connected directly by means of radial extensions with the comparatively cool bearing support 15. Accordingly the radial temperature gradient in flange 101 and hook portion 95 is comparatively small and the latter are free to expand and contract substantially as annuli of uniform temperature without suffering permanent deformation.

In order to facilitate control of the axial temperature gradient along the tubular heat dissipating bodies 96 and 100, cooling air is supplied via duct 104 from a suitable source of pressurized air, as for example the discharge air from the engine compressor driven by shaft 16. Duct 104 communicates with duct 104a extending axially in support 15, from which air is conducted into an annular groove 105 formed in the outer periphery of hub or support 15. The latter groove is covered by a sleeve 106 having a plurality of circumferentially spaced air discharge ports which permit passage of the cooling air into the space between the outer circumference of support 15 and the interior of tubular body 96. From there a portion of the cooling air passes through a plurality of ports 107 in body 96 into the space between the latter and body 100. The air between the bodies 96 and 100 and between the body 96 and support 15 flows axially toward rotor 17 and is discharged through openings 108 in a cover plate 109 into the annular space between the latter plate and rotor 17 and thence radially outward into the passage 23. The plate 109 is suitably secured to the right end of support 15 and extends radially to adjacent the inner surface of the shroud segments 24.

A branch air duct 110 also connects duct 104a and an annular groove 111 formed in the interior surface of hub or support 15 confronting ported sleeve 20, whereby the cooling air is discharged to the labyrinth seal 19. From the seal 19 the cooling air flows axially in opposite directions, either into the space between rotor 17 and plate 109 and thence into passage 23 as aforesaid, or into an annular drain groove 112 formed in the interior surface of support 15 at the left end of seal 19 and communicating with a suitable oil reservoir by means of a duct in support 15 similar to duct 104a. Also lubricating oil is conducted to the ported bushing 18 by means of an annular groove 113 in the inner surface of support 15 confronting bushing 18, the groove 113 being connected with a pressurized oil supply by means of a duct in support 15 similar to duct 104a.

I claim:

1. In a gas turbine engine, a rotor, a fixed hub for said rotor, a shaft secured coaxially to said rotor for rotation therewith and journalled in said hub, passage means for conducting hot motive gases to said rotor to drive the same, a plurality of flow directing nozzles in said passage means adjacent said rotor and spaced around its axis of rotation, said nozzles having footings extending radially inwardly, a pair of heat dissipating means arranged around said axis, one of said heat dissipating means engaging said footings at one axial side thereof, the other of said heat dissipating means engaging said footings at the opposite axial side thereof, said heat dissipating means engaging the opposite sides of said footings cooperating to comprise supporting means for said footings and extending axially and radially inwardly therefrom to said hub and being secured thereto in heat transfer relationship, means shielding said hub from said hot motive gases to effect an appreciable axial temperature gradient along the axial lengths of said heat dissipating means to enable radial thermal expansion and contraction of said supporting means comparatively freely in conformity with the radial thermal expansion and contraction of said rotor.

2. In a gas turbine engine, a rotor, a fixed hub for said rotor, a shaft secured coaxially to said rotor for rotation therewith and journalled in said hub, passage means for conducting hot motive gases to said rotor to drive the same, a plurality of flow directing nozzles in said passage means adjacent said rotor and spaced around its axis of rotation, said nozzles having footings extending radially inwardly, a pair of heat dissipating means arranged around said axis, one of said heat dissipating means engaging said footings at one axial side thereof, the other of said heat dissipating means engaging said footings at the opposite axial side thereof, at least one of said heat dissipating means resiliently engaging said footings to urge the same tightly against the other heat dissipating means, said pair of heat dissipating means cooperating to clamp said footings therebetween and to comprise supporting means for said footings, said heat dissipating means extending axially and radially inwardly from said footings to said hub and being secured thereto in heat transfer relationship, means shielding said hub from said hot motive gases to effect an appreciable axial temperature gradient along the axial lengths of said heat dissipating means to enable radial thermal expansion and contraction of said supporting means comparatively freely in conformity with the radial thermal expansion and contraction of said rotor.

3. In a gas turbine engine, a rotor, a fixed hub for said rotor, a shaft secured coaxially to said rotor for rotation therewith and journalled in said hub, passage means for conducting hot motive gases to said rotor to drive the same, a plurality of flow directing nozzles in said passage means adjacent said rotor and spaced around its axis of rotation, said nozzles having footings extending radially inwardly, said footings having flange means arranged around said axis and extending in one axial direction, a pair of heat dissipating means arranged around said axis, one within the other, said one heat dissipating means engaging radially inner portions of said footings in supporting relation and terminating in annularly arranged reversely turned hook means hooked around said flange means, the other heat dissipating means terminating in annularly arranged resilient portions engaging said footings at the axial side thereof opposite said flange means and yieldingly urging the latter in said axial direction into engagement with said hook means, the portions of said heat dissipating means engaging said footings comprising supporting means therefor, said heat dissipating means extending from said supporting means oppositely from said axial direction and radially inwardly to said hub and being secured thereto in heat transfer relationship, means shielding said hub from said hot motive gases to effect an appreciable axial temperature gradient along the axial lengths of said heat dissipating means to enable radial thermal expansion and contraction of said supporting means comparatively freely in conformity with the radial thermal expansion and contraction of said rotor.

4. In a gas turbine engine, a rotor, a fixed hub for said rotor, a shaft secured coaxially to said rotor for rotation therewith and journalled in said hub, passage means for conducting hot motive gases to said rotor to drive the same, a plurality of flow directing nozzles in said passage means adjacent said rotor and spaced around its axis of rotation, an outer shroud defining an outer wall portion of said passage means and extending around the periphery of said rotor, said outer shroud being supported at least in part by the radially outer ends of said nozzles, an inner shroud arranged within said outer shroud in spaced relation and defining an inner wall portion of said passage means, said inner shroud supporting said nozzles and comprising a plurality of circumferentially extending segments having radially inwardly extending footings, a pair of tubular heat dissipating bodies arranged one within the other generally coaxially with said axis of rotation, each heat dissipating body having supporting portions engaging said footings at one of each of the opposite axial sides thereof and cooperating to clamp said footings resiliently therebetween, said heat dissipating bodies extending axially and radially inwardly from said supporting portions to said hub and being secured thereto in heat transfer relationship, means shielding said hub from said hot motive gases to effect an appreciable axial temperature gradient along the axial lengths of said bodies to enable radial thermal expansion and contraction of said supporting portions comparatively freely in conformity with the radial thermal expansion and contraction of said rotor and outer shroud.

5. In a gas turbine engine, a rotor, a fixed hub for said rotor, a shaft secured coaxially to said rotor for rotation therewith and journalled in said hub, passage means for conducting hot motive gases to said rotor to drive the same, a plurality of flow directing nozzles in said passage means adjacent said rotor and spaced around its axis of rotation, an annular outer shroud defining an outer wall portion of said passage means and extending around the periphery of said rotor, said outer shroud being supported at least in part by the radially outer ends of said nozzles, an annular inner shroud arranged within said outer shroud in spaced relation and defining an inner wall portion of said passage means, said inner shroud supporting said nozzles and comprising a plurality of circumferentially extending segments having radially inwardly extending footings, said footings providing annularly arranged flange means extending in one axial direction, a pair of tubular heat dissipating bodies arranged one within the other generally coaxially with said axis of rotation, the innermost tubular body terminating in an annular hook portion engaging said flange means, the outermost tubular body terminating in an annular resilient portion engaging said footings in opposition to said hook portion and yieldingly urging said flange means into engagement with said hook portion, said heat dissipating bodies extending axially and radially inwardly from said hook portion and resilient portion in the direction opposite said one direction to said hub and being secured thereto in heat transfer relationship, means shielding said hub from said hot motive gases to effect an appreciable axial temperature gradient along the axial lengths of said bodies to enable radial thermal expansion and contraction of said hook portion and resilient portion comparatively freely in conformity with the radial thermal expansion and contraction of said rotor and outer shroud.

6. In a gas turbine engine, a rotor, a fixed hub for said rotor, a shaft secured coaxially to said rotor for rotation therewith and journalled in said hub, passage means for conducting hot motive gases to said rotor to drive the same, a plurality of flow directing nozzles in said passage means adjacent said rotor and spaced around its axis of rotation, an annular outer shroud defining an outer wall portion of said passage means and extending around the periphery of said rotor, said outer shroud being supported at least in part by the radially outer ends of said nozzles, an annular inner shroud arranged within said outer shroud in spaced relation and defining an inner wall portion of said passage means, said inner shroud supporting said nozzles and comprising a plurality of circumferentially extending segments having a pair of annularly arranged and axially spaced sets of legs extending radially inwardly, a pair of tubular heat dissipating bodies arranged one within the other generally coaxially with said axis of rotation, the innermost tubular body engaging the radially inner ends of said legs in supporting relation and terminating in an annular flange engaging the legs of one of said sets, the outermost tubular body terminating in an annular flange engaging the legs of the other of said sets, said flanges clamping said legs therebetween, said tubular bodies extending radially inwardly and axially opposite said one direction from said flanges to said hub and being secured thereto in heat transfer relationship, means shielding said hub from said hot motive gases to effect an appreciable axial temperature gradient along the axial lengths of said bodies to enable radial thermal expansion and contraction of said bodies at the regions of said flanges comparatively freely in conformity with the radial thermal expansion and contraction of said rotor and outer shroud, and means for supplying fluid coolant to the spaces between said tubular bodies and between said sets of legs to control said axial temperature gradient.

7. In a gas turbine engine, a rotor, a fixed hub for said rotor, a shaft secured coaxially to said rotor for rotation therewith and journalled in said hub, passage means for conducting hot motive gases to said rotor to drive the same, a plurality of flow directing nozzles in said passage means adjacent said rotor and spaced around its axis of rotation, said nozzles having a pair of annularly arranged and axially spaced sets of footings extending radially inwardly, a pair of tubular heat dissipating means arranged around said axis, one within the other, said one heat dissipating means engaging the radially inner ends of said footings in supporting relation, said pair of heat dissipating means terminating in clamping portions resiliently engaging said footings at the axially opposite sides thereof and clamping said footings therebetween, said heat dissipating means extending axially from their clamping portions and radially inwardly to said hub and being secured thereto in heat transfer relationship, means shielding said hub from said hot motive gases to effect an appreciable axial temperature gradient along the axial lengths of said seat dissipating means to enable radial thermal expansion and contraction of said clamping portions comparatively freely in conformity with the radial thermal expansion and contraction of said rotor, and means for supplying fluid coolant to the spaces between said tubular heat dissipating means and between said sets of footings to control said axial temperature gradient.

References Cited in the file of this patent
UNITED STATES PATENTS

| | | |
|---|---|---|
| 2,488,875 | Morley | Nov. 22, 1949 |
| 2,606,741 | Howard | Aug. 12, 1952 |
| 2,916,874 | Worobel | Dec. 15, 1959 |
| 2,960,306 | Collman et al. | Nov. 15, 1960 |